United States Patent

[11] 3,549,183

[72] Inventor Carl W. Smollinger
    Williamsport, Pa.
[21] Appl. No. 807,635
[22] Filed Mar. 13, 1969
[45] Patented Dec. 22, 1970
[73] Assignee Bethlehem Steel Corporation
    a corporation of Delaware

[54] VIBRATION DAMPED FITTING
    5 Claims, 3 Drawing Figs.
[52] U.S. Cl. .................................................. 287/82,
    24/125
[51] Int. Cl. .................................................. F16b 7/00
[50] Field of Search ........................................ 287/80, 82,
    83, 76; 24/123.2, 125, 122.6; 174/79; 248/18, 60;
    294/74, 78

[56] References Cited
UNITED STATES PATENTS
| 1,236,115 | 8/1917 | Shepard | 24/122.6 |
| 1,581,561 | 4/1926 | Yeaton et al. | 24/123.1 |
| 1,593,069 | 7/1926 | Griswold | 24/122.6 |

Primary Examiner—Reinaldo P. Machado
Assistant Examiner—Andrew V. Kundrat
Attorney—A. M. Griffin ABSTRACT: A vibration damper assembly for socket type end fittings on wire rope and strand including a flange on the end of the fitting, a flange on a clamp resiliently secured to the rope adjacent the fitting and a resilient plastic ring mounted between the flanges. A lubrication reservoir is provided about the strand within the plastic ring.

INVENTOR
Carl W. Smollinger

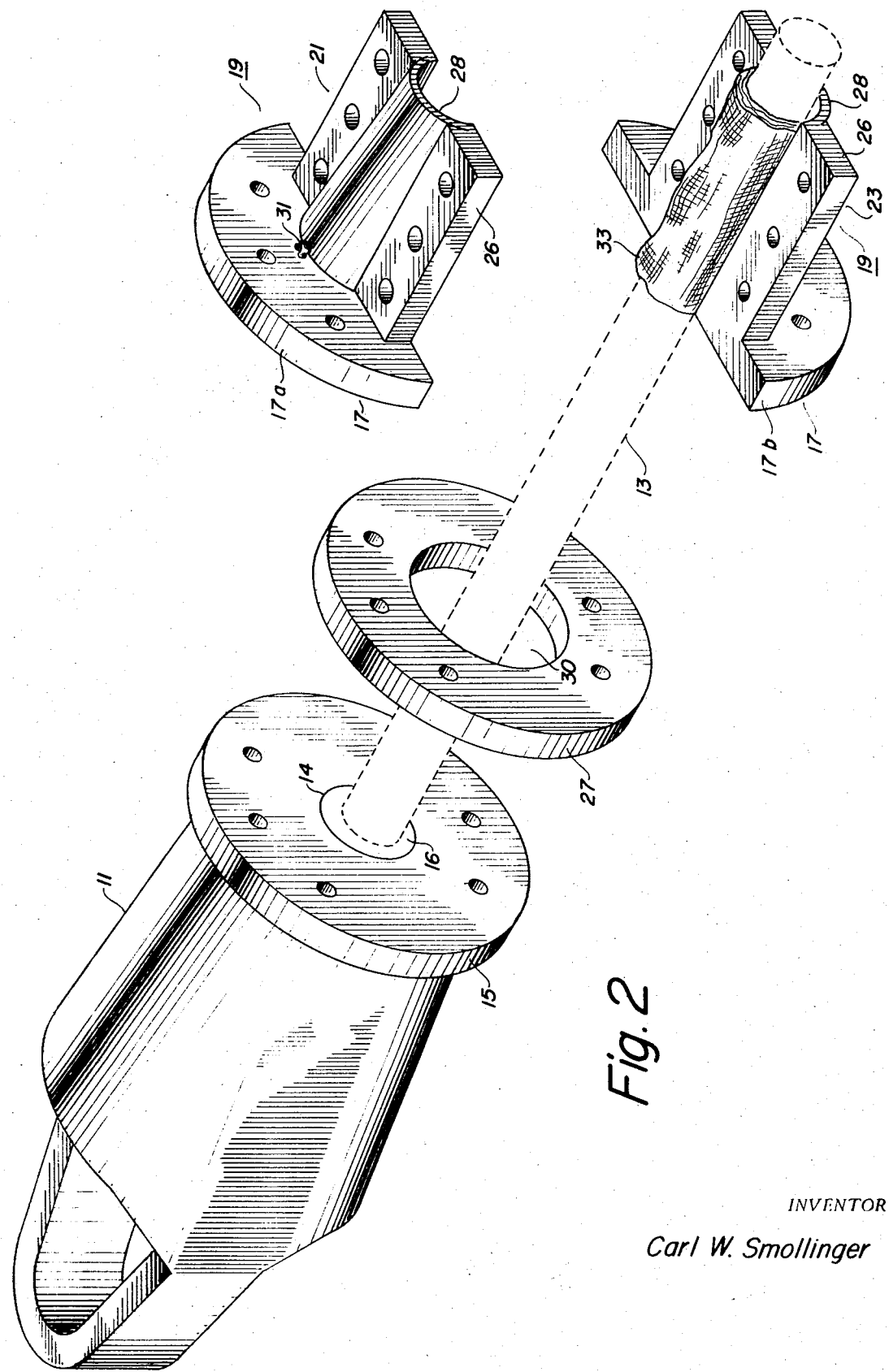

ced: 3,549,183

VIBRATION DAMPED FITTING

BACKGROUND OF THE INVENTION

This invention relates to the alleviation of fatigue in wire ropes and strands by means of vibration damping and particularly to the provision of integral vibration damping means on a socket type end fitting.

Wire rope and strand subjected to shock and widely fluctuating loads, such as occurs in large earth moving machinery, as for instance boom suspender strands and hoist lines on drag lines, shovels and other excavating equipment, is often subject to premature failure due to wire fatigue. Fatigue of the wires of the strand is particularly liable to occur at or adjacent to fittings mounted on the strand. This is due to the concentration of stress in the strand adjacent the fitting due to repeated torque and sinusoidal vibrations caused by repetitive cycles of loading and unloading.

Various expedients have been resorted to in the past to decrease such vibrations such as contacting the rope with wooden dampers, altering the weight of the fittings to alter the vibration cycle, or, in the case of swaged fittings, by tapering the ends of the fitting to provide increased flexibility to the ends of the fitting. Wooden dampeners are worn away very quickly by the vibrations of the rope contacting them. Alteration of the vibration cycles by weight changes has not proved effective. Tapered end sections by themselves are more effective in relieving strains caused by abrupt though slight bending of the strands adjacent the fitting and are better adapted for use on compression type fittings.

SUMMARY OF THE INVENTION

The foregoing difficulties have been alleviated by the present invention. The invention is particularly applicable to use with hot metal type sockets mounted upon large wire ropes. It is, however, also applicable to use with compression fittings.

In accordance with the invention a flange is provided on one end of the fitting. A second flange is mounted on a split clamp which is secured to the rope adjacent the end of the fitting. The two flanges are then secured together with a thick plastic ring inserted between them. A padding is provided within the clamp sections about the rope. The plastic ring and the padding damp out vibrations in the rope preventing fatigue and failure of the wires, particularly adjacent the fitting. An opening or reservoir is also provided within the plastic ring about the rope with provision to keep this reservoir filled with heavy lubricant. This lubricant provides further damping of vibrations in the strand and maintains the wires adjacent the fitting thoroughly lubricated. The lubrication decreases friction between the wires allowing more efficient damping and further decreasing fatigue of the wires by allowing freer movement of the wires.

BRIEF DESCRIPTION OF THE DRAWINGS

FIG. 2 is an exploded isometric view of the fitting shown in FIG. 1.

DESCRIPTION OF THE PREFERRED EMBODIMENT

Figures 1, 3:
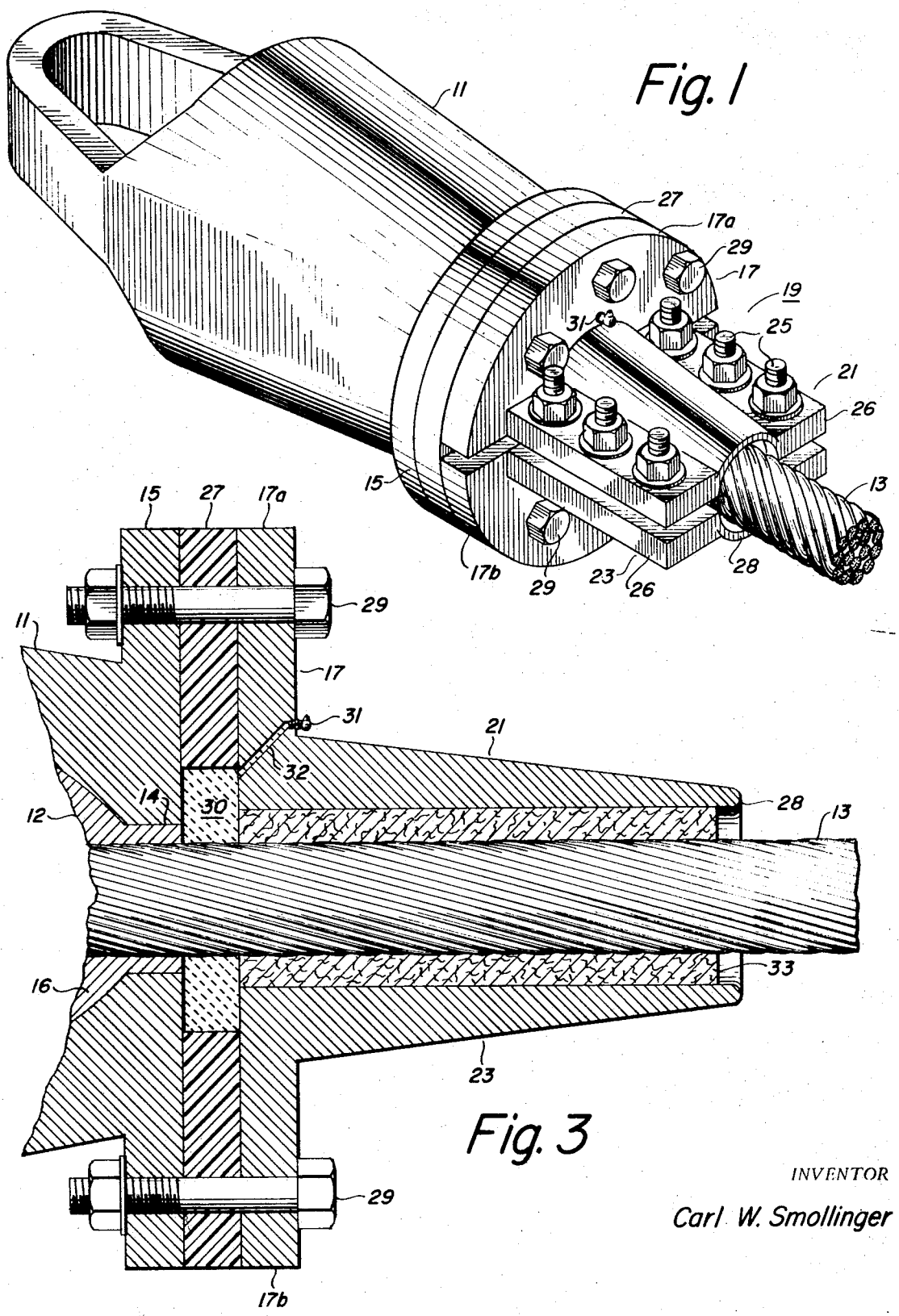
FIG. 1 is an isometric view of a fitting according to the present invention secured to the end of a wire rope.
FIG. 3 is a longitudinal cross section of the fitting.

A zinc socket type fitting 11 is shown in FIG. 1. As is well understood in the art this fitting has a bowl 12 at one end into which a wire rope or strand 13 is inserted through an orifice 14 in the bottom of the fitting. The individual wires or strands of the strand or rope 13 are partially unlaid and broomed outwardly within the bowl and molten zinc or other suitable molten metal 16 is poured into the bowl around the wires or strands and allowed to solidify.

A flange 15 is positioned on the bottom of socket 11. Flange 15 is preferably cast as an integral portion of the socket 11 but may, if desired, be welded onto the socket.

A second flange 17 is mounted as an integral part of a rope clamp assembly 19 comprised of an upper clamp section 21 and a lower clamp section 23 secured together about rope or strand 13 by bolts 25 passing through flanges 26 positioned on either side of tapered nose sections 28 of clamp assembly 19. Flange 17, is, as shown, comprised of two split sections 17a and 17b secured to the respective clamp sections 21 and 23. The clamp assembly 19 may be comprised of two unitary cast sections or may be fabricated from separate parts welded together.

A plastic ring 27 is positioned between flanges 15 and 17 and the two flanges are tightly secured together by bolts 29. As shown more clearly in FIGS. 2 and 3 the central orifice in plastic ring 27 is larger in diameter than the diameter of the rope or strand 13. This provides within the ring 27 when it is assembled between flanges 15 and 17, a reservoir 30 for heavy lubrication surrounding the strand at the point at which strand 13 enters the socket 11 through orifice 14. A lubricant fitting 31 and lubricant channel 32 leading to reservoir 30 are provided to allow the lubricant to be renewed periodically as it seeps into and along the strands continuously lubricating the wires of the strand. The reservoir 30 should be kept well filled with lubricant at all times for best results.

Plastic ring 17 is preferably at least from one half an inch thick to 1½ to 2 inches or more thick depending upon the diameter of the rope. As a rough rule it can be said that the plastic ring should have a thickness corresponding approximately to one half the diameter of the wire rope which is to be damped. A plastic ring 1½ inch thick has been found very suitable for use with a 3⅝ inch diameter rope. Any suitable plastic which is firm, resilient, tough and shock resistant may be used. A polyurethane plastic has been found very suitable. Air curing as well as thermosetting plastics might be used. The central orifice in plastic ring 17 should be at least one half inch larger in diameter than the diameter of the wire rope or strand.

If desired plastic ring 27 may be split or segmented to allow for more convenient assembly around the rope or strand 13. Segmenting will facilitate partial disassembly for periodic inspections of the strand adjacent the fitting.

Clamp sections 21 and 23 are lined with a padding material 33 such as oil soaked cotton belting material. The padding material protects the wires of the strand or rope 13 from damage by the clamp sections, increases the damping effect, acts as a seal to maintain the lubricant within the reservoir formed by the central orifice of plastic ring 27 and serves as an auxiliary lubricant reservoir and wick to aid in distributing the lubricant to all sections of the wire rope or strand 13 within the vibration damper. Other padding materials can be used but they should preferably be suitable for thorough impregnation with lubricant in order to attain a maximum damping effect.

Bolts 25 should be tightly drawn up to secure a firm grip by the clamp sections 21 and 23 on the rope or strand 13. Likewise bolts 29 should be tightly drawn up to secure the clamp assembly 19 firmly to the end of the socket fitting 11.

The combined action of the padding 33, plastic ring 27 and surrounding lubricant serve very effectively when the damper assembly is secured firmly to the strand and the end fitting, to damp out both torque and sinusoidal vibrations in the strand.

By the use of the vibration damper of the present invention the fatigue life of wire rope or strand has in tests been increased 2 to 4 times on the average over normal fatigue life of strand socketed in conventional sockets without the use of damping means.

Furthermore, with the use of the damper assembly of the present invention when failure of the individual wires of the strand ultimately begins to occur after an extended period, such failure invariably occurs in a stretch of the strand or rope well away from the fitting where it can more easily be detected, rather than immediately adjacent the fitting or even partially within the fitting as has heretofore tended to occur. The safety of the equipment is thereby considerably enhanced, particularly under field conditions.

While the damper assembly of the present invention has been described with respect to a hot metal type end socket for which it is particularly well adapted it will be understood that it could also be used with a compression type socket or end fitting. In a compression type socket the main body portion of the socket or sleeve would be compressed or swaged upon the end of the strand leaving an integral flange provided at the end of the fitting uncompressed and the damper assembly would then be secured to this flange in the same manner as illustrated for hot metal type socket end fittings.

I claim:

1. A vibration damper assembly for end fittings on wire cable comprising:
   a. a first flange mounted on one end of said fitting;
   b. a clamp adapted to be secured to said wire cable adjacent said fitting;
   c. a second flange mounted on one end of said clamp adjacent said fitting;
   d. a plastic ring adapted to be mounted between the first and second flanges; and
   e. securing means to nonrigidly secure the first and second flanges together through the plastic ring.

2. A vibration damper assembly for end fittings on wire cable according to claim 1 wherein said clamp of (b) is comprised of at least two clamp sections.

3. A vibration damper assembly for end fittings on wire cable according to claim 2 additionally comprising: f. padding positioned within the said clamp sections against the cable.

4. A vibration damper assembly for end fittings on wire cable according to claim 3 wherein the diameter of said plastic ring is significantly greater than the diameter of the wire cable, the chamber thus formed concentric with the cable being adapted to contain lubrication.

5. A vibration damper assembly for end fittings on wire cable according to claim 4 wherein the padding in (f) is adapted for impregnation with lubricant.